(12) United States Patent
Urban

(10) Patent No.: US 10,766,081 B2
(45) Date of Patent: Sep. 8, 2020

(54) FINISHING DEVICE

(71) Applicant: URBAN Machinery Corporation, Fredericton (CA)

(72) Inventor: Thomas Urban, Bad Grönenbach (DE)

(73) Assignee: URBAN Machinery Corporation, Fredericton (CA)

(*) Notice: Subject to any disclaimer, the term of this patent is extended or adjusted under 35 U.S.C. 154(b) by 0 days.

(21) Appl. No.: 15/979,282

(22) Filed: May 14, 2018

(65) Prior Publication Data

US 2018/0333790 A1 Nov. 22, 2018

(30) Foreign Application Priority Data

May 16, 2017 (DE) .................... 20 2017 102 951 U

(51) Int. Cl.
*B23C 3/12* (2006.01)
*B23C 1/10* (2006.01)
(Continued)

(52) U.S. Cl.
CPC ................ *B23C 3/128* (2013.01); *B23C 1/10* (2013.01); *B23C 1/12* (2013.01); *B23D 45/003* (2013.01);
(Continued)

(58) Field of Classification Search
CPC ....... B23C 3/128; B23C 3/12; B23C 2220/40; B23C 2255/00; B23C 2255/04; B23C 2255/08; B23C 2255/12; Y10T 409/304256; Y10T 29/5152–5167; Y10T 29/519; Y10T 408/37; Y10T 409/306496;
(Continued)

(56) References Cited

U.S. PATENT DOCUMENTS 3,259,958 A * 7/1966 Lemelson ............ B23Q 1/0009
408/3
5,298,844 A * 3/1994 Nagasaki ............. B23Q 1/4857
318/568.11
(Continued)

FOREIGN PATENT DOCUMENTS

DE 20318660 U1 2/2004
DE 102006007171 A1 * 8/2007
(Continued)

OTHER PUBLICATIONS

German Search Report for Application No. 2020171029514, dated Feb. 8, 2018, three pages.*
(Continued)

*Primary Examiner* — Erica E Cadugan
(74) *Attorney, Agent, or Firm* — KPPB LLP

(57) ABSTRACT

The invention relates to a finishing device for removing the weld bead generated during welding of a window or door frame or frame section at the mitered surfaces, wherein the finishing device comprises a support surface for the frame or frame section and a processing arm for supporting a tool holder, and the processing arm consists of a plurality of arm elements that move in hinged fashion relative to one another but can also be fixed in place, wherein the tool holder comprises at least two cutting tools driven by a rotational drive, said tools rotating about a tool axis and at least one tool laterally next to the blade of the tool, contact sides.

10 Claims, 2 Drawing Sheets

(51) Int. Cl.
- B23C 1/12 (2006.01)
- B23P 23/02 (2006.01)
- B25J 11/00 (2006.01)
- B24B 27/04 (2006.01)
- B25J 15/00 (2006.01)
- B24B 7/10 (2006.01)
- B23D 45/00 (2006.01)
- B23Q 39/02 (2006.01)

(52) U.S. Cl.
CPC .......... B23P 23/02 (2013.01); B23Q 39/024 (2013.01); B23Q 39/027 (2013.01); B24B 7/10 (2013.01); B24B 27/04 (2013.01); B25J 11/006 (2013.01); B25J 11/0065 (2013.01); B25J 15/0019 (2013.01); B25J 15/0057 (2013.01); *B23C 2220/40* (2013.01); *B23C 2255/08* (2013.01); *Y10S 901/41* (2013.01); *Y10T 29/5107* (2015.01); *Y10T 29/5155* (2015.01); *Y10T 29/5182* (2015.01); *Y10T 409/3084* (2015.01); *Y10T 409/304144* (2015.01); *Y10T 409/304256* (2015.01); *Y10T 409/307672* (2015.01); *Y10T 409/308568* (2015.01)

(58) Field of Classification Search
CPC . Y10T 409/304144; Y10T 409/308624; Y10T 409/308176; Y10T 409/3084; B25J 11/006; B25J 15/0066; B25J 15/0057; B29C 37/04; B23B 29/24–34; B23B 39/20; B23B 39/205; B23Q 2039/004; B23Q 2220/002; B23Q 9/0028; B23Q 9/0071

USPC ............... 409/140, 180, 138, 218, 214, 210; 29/26 R, 26 A, 33.5–48.5 A, 33 J; 408/35

See application file for complete search history.

(56) References Cited

U.S. PATENT DOCUMENTS

| | | | | |
|---|---|---|---|---|
| 7,954,216 B2 * | 6/2011 | Sturm | ............... | B23B 39/16 |
| | | | | 144/35.1 |
| 2012/0322349 A1 * | 12/2012 | Josi | ................ | B24B 19/14 |
| | | | | 451/73 |
| 2015/0063936 A1 | 3/2015 | Azzarello et al. | | |
| 2018/0001484 A1 * | 1/2018 | Hirashima | ........... | B23B 39/166 |

FOREIGN PATENT DOCUMENTS

| | | | |
|---|---|---|---|
| DE | 102011054885 A1 | | 5/2013 |
| DE | 202014104946 U1 | * | 2/2016 |
| EP | 705659 A1 | * | 4/1996 |
| EP | 1543906 A1 | | 6/2005 |
| EP | 2875887 A1 | | 5/2015 |
| FR | 2875165 A1 | | 3/2006 |
| GB | 2283193 A | * | 5/1995 |
| JP | 11-239909 A | * | 9/1999 |
| JP | 2012-016791 A | * | 1/2012 |
| WO | WO-2015097081 A1 | * | 7/2015 |

OTHER PUBLICATIONS

Machine Translation JP 2012-016791, which JP '791 was published Jan. 2012.*

Machine Translation of EP 705659 A1, which EP '659 was published Apr. 1996.*

* cited by examiner

FINISHING DEVICE

CROSS-REFERENCE TO RELATED APPLICATIONS

This application claims priority to German patent application number 202017102951.4 filed on May 16, 2017.

BACKGROUND OF THE INVENTION

The invention relates to a finishing device for removing the weld bead that arises at the mitered surfaces of a door or window frame or frame section during welding, wherein the finishing device comprises a supporting surface for the frame or frame section.

There are a wide variety of materials used today for the manufacture of door or window frames. In addition to wood and metal, plastic profiles are especially used in order to form corresponding door or window frames. Door and window frames are understood here to mean both the block frame placed in the building opening as well as the casement frame that is hung in the block frame.

The plastic profiles comprise a thermoplastic material that can be welded. In the process, the plastic profile is first mitered, the mitered surfaces are heated by the welding plate of a welder and the hot mitered surfaces are pressed, and thus welded, together, resulting in a solid mechanical connection A weld bead results, consisting of plastic material that is heated and displaced from the contours of the two profiles during the joining process; this material must be removed after welding since for one thing this weld bead is unattractive to look at, and for another it can be functionally disruptive on the inside.

The finishing device is a category of equipment provided to remove the weld bead. In the process, the finishing device comprises a support surface for the frame or frame section, the surface often also including a clamping device for precisely positioning the frame or frame section and other elements. For example, a cutting blade has been provided to remove the weld bead, the blade being movable within a plane by a support arm. This plane of movement is cleverly oriented parallel to the mitered surface in this case. Such a design permits movement of the support arm with relative ease.

The disadvantage to this design is that the support arm must be stable since the blade is responsible for removing the weld bead and bead chips, and the working force to accomplish this must come from the motion of the support arm. The required mechanical sturdiness results in a stable but also large support arm. To work on the inner corners, the tool, which is held by the support arm, must reach into the inner area of the frame and in this case a support arm which is too large, since it was designed to be sturdy, results in corresponding limitations to a minimum window or frame size that can be processed using such a finishing machine.

BRIEF SUMMARY OF THE INVENTION

Therefore, it is the object of the present invention to propose a finishing device that is more flexible in its use, and in particular is able to efficiently process frames and frame sections that have relatively small dimensions.

To solve this problem, the invention starts with a finishing device as described above and proposes that in addition to a support surface for the frame or frame section it also comprise a machining arm for supporting a tool holder. Here, the machining arm consists of a plurality of arm elements hinged together movably but also positionally-fixable relatively to one another, wherein the tool holder comprises at least two machining tools driven by a rotational drive, each of said tools rotating about a tool axis, at least one tool comprising lateral contact side members in addition to the tool blade.

A robot arm of an industrial robot, for example, is useful as a machining arm, the arm consisting of a plurality of arm elements hinged together movably but also positionally-fixable relatively to one another.

By using such a robot arm, a high mobility is achieved, resulting in the ability to efficiently machine the inner corners in relatively compact frames and frame sections. In the process, what is very helpful is that the multiple-membered support arm has a high mobility, and so the tool is efficiently guided as it machines the inner corner. The best feature of the invention is that such a robot arm is not combined with a passively drawn blade, but that actively-driven machining tools can be used to avoid too high of a mechanical load on the individual arm elements. This makes it possible to make the support arm even smaller, whereby the flexibility of such a finishing device according to the invention is further increased.

The proposal according to the invention thus cleverly combines the high tool guidance and mobility freedom, which is desirable for machining more complex profile cross sections, on the one hand with the ability to machine a large dimensional frame area, and on the other hand with a machining concept that does not overload the arm elements and connecting joints thereof.

According to the invention, at least one tool comprises contact side members laterally in addition to the tool blade. Each of the contact side members has a front edge that sits against the profile surface when the respective tool is used. Therefore, the extensions of the respective edges include an angle that generally corresponds to the internal angle of the frame. The advantage of using contact side members is that the machining arm or robot arm doesn't have to be precisely guided, a requirement which in this kind of machining application could be counterproductive in some cases since the mitered edge to be machined—from which the weld bead is to be removed—may not in fact always be located at a defined position (when multiple weld bead removals are to be performed one after the other).

In a preferred embodiment of the proposal, the tool axes of the tools are not oriented parallel relative to one another. This geometric arrangement permits complex contours to be reliably machined in the mitered area since the axes of rotation of the tools (=tool axes), the axes being oriented at angles relative to one another, can assume a variety of overall tool holder working angles relative to the plane defined by the two welded profiles. According to the invention, the same tool is arranged at two different angular positions at the tool holder relative to the diameter or length of the tool, thus achieving a higher life for this type of tool.

Moreover, the proposal advantageously provides that two tool axes are oriented askew or at right angles relative to one another. The invention proposes that the position of the individual tool axes of the differently-rotationally-driven tools can be oriented at the tool holder in many different ways as desired. Skew axes are characterized in that they do not intersect. In order to describe the angular position of such axes, we will use a small model. Here, the tool axis sits at a right angle relative to a reference surface normal thereto. The respective tool axis reference surfaces intersect when the tool axes are askew under an acute angle, for example. Of course it is possible that these skew tool axes intersect at a right angle but is also possible and equally encompassed by the invention that the tool axes are disposed at right angles to one another one atop the other, in other words the axes intersect at an origin.

Here, it is even possible to displace the angular position of at least one tool on the tool holder relative to the tool holder, for example using a separate drive. This results in even more adjustability of the invention to meet the special design of the profile to be finished.

Moreover, a central rotating drive is provided in the tool holder for all tools. In order to drive the differently oriented tools at the tool holder using a common rotating drive, a transmission is provided. The advantage of such an embodiment is that the drive only needs to be implemented once. In addition to lower costs, this solution also reduces weight.

In an advantageous embodiment, each tool is assigned to a dedicated rotating drive, respectively. In this variant, additional weight will in fact need to be borne by the machining arm for the individual rotating drive, but this rotating drive then only drives a dedicated machining tool, thereby operating more efficiently.

It is cleverly provided that a pneumatic motor is provided as the rotating drive. A pneumatic motor is operated using compressed air. The advantage of this energy medium is that it is essentially harmless compared to pressurized hydraulic oil or electrical power. Compressed air can be controlled easily using pneumatic valves, and the distribution of the compressed air in the tool holder can be done using hose lines. Such drive concepts on the market are available with sufficient torque and can thereby provide the desired machining forces with a minimum of load on the arm elements of the machining arm.

Of course, it is possible to use other motors instead of a pneumatic motor, such as electric motors, hydraulic motors or the like in the implementation of this invention.

In another preferred embodiment, the tool holder holds tools that are driven exclusively by at least one rotational drive. In this proposal, no tools that perform machining only due to the motion of the overall tool holder are used at all. This includes passively drawn blades as described above, for example. Of course, the tool holder moves during machining, and therefore guides the rotationally-driven tool at the respective machining points, but this motion is limited to positioning the machining tool, whereas the energy for cutting away the weld bead is done by the rotationally-driven tool. Since all of the tools held by the tool holder are driven by a rotating drive (each individually or centrally, respectively) and make cuts through rotating motion, respectively, the machining arm is considerably unburdened.

Moreover, the task of the proposed contact side members or contact runners is also to prevent the cutting tool, for example a router, from plunging too deeply into the profile or the miter area, thereby resulting in imperfections due to notches that are too deep.

The contact side members proposed here permit the tool to detect the actual point of the weld bead itself by holding the tool holder movably or floating in a plane parallel to the plane defined by the two welded profiles. Such mobility or holding is easily possible using the industrial robots used here by first moving the tool holder in a first direction in the detection process, for example, until the contact side abuts the profile, thereby preventing further brute movement of the tool holder in this first direction. Then, the direction of motion of the tool holder is modified until the second contact side also abuts the profile and thus the exact position of the miter and thereby the exact position of the weld bead is found.

In addition to this "floating" software control system, if necessary also supported by end and proximity switches, a floating support of the respective tool is of course also provided on the tool holder within the scope of the invention.

If the imprecisions compensated by the "floating" support are small, for example only a few millimeters, this can also be achieved through the elasticity of the motion arm.

Here, detection of both the inside and the outside of the frame is possible, as described.

In an advantageous manner, an interface is provided in the center of the tool holder at which the tool holder can be connected to the arm element of the machining arm. Such a design can allow the last arm elements of the machining arm to be kept as far away as possible from the machining area, which prevents interference contours and increases mobility. In the process, the tool holder can be cleverly designed to be relatively long. Since the machining forces for cutting away the weld bead do not have to be applied by the motion of the machining arm, high torque due to the fact that the tool holder is then larger (such torques would otherwise have a negative effect on the arm elements and the joints connecting them) is not generated since the tools themselves are rotationally-driven and remove the weld bead and cuttings in this way.

Therefore, in the proposal it is also advantageous that the tools are disposed at the end of the tool holder far from the interface, i.e. at the longitudinal end of the tool holder, for example.

In a preferred embodiment of the proposal, the tools are disposed at the tool holder on both sides of the interface. By disposing the tools on both sides this way, and symmetrically if necessary, a large number of tools can be positioned on the tool holder which do not interfere with one another during use.

Moreover, at least one tool is located in the middle area between the ends of the tool holder, in particular on the side, or back side, opposite the interface. This proposal allows a larger number of tools to be disposed on the tool holder, and clever guidance of the tool holder allows problem-free use of the tools. For example, in the middle area not just one, but a plurality of tools can be provided next to one another, if necessary oriented differently. Of course, due to the larger number of tools, the flexibility of such an arrangement also increases.

In particular, it is advantageous to be able to dispose a tool on the back side precisely opposite the interface more mechanically durable in the direction of the tool axis (the rotational axis of the tool) since these forces can be introduced directly to the last arm element of the machining arm and as such not apply any damaging torque to the last arm element. This can be a drill, for example.

A clever way has been found to provide a saw blade, an end mill, a drill, a cylindrical mill or a face mill as a tool.

Another advantage of the embodiment according to the invention is that the finishing device comprises at least one other tool holder with cutting tools, and that this other tool holder is maintained in a changing station of the finishing device, the machining arm moving to the station when necessary if a change of tool holder is required. Also, this second, other tool holder cleverly preferably comprises only cutting tools that are rotationally-driven. The flexibility of such a finishing device so equipped is considerably increased with respect to the various machining options, but also with respect to the frame dimensions to be machined.

BRIEF DESCRIPTION OF THE SEVERAL VIEWS OF THE DRAWINGS

The invention is shown schematically in the drawing in an exemplary embodiment. Shown are.

DETAILED DESCRIPTION OF PREFERRED EMBODIMENTS

In the figures, the same elements, or elements that correspond with one another, are identified with the same reference numbers and are therefore not described again unless it is useful to do so. The disclosures contained in the overall description are logically analogous and convertible to the same parts that have the same reference numbers or the same component names. Also, the positional information selected in the description, such as top, bottom, side, etc., refer to the figure directly described and shown and are logically convertible to the new position when a positional change is made. Furthermore, individual features or featural combinations from the various exemplary embodiments shown and described can represent independent, inventive solutions in their own right or according to this invention.

Figure 1:
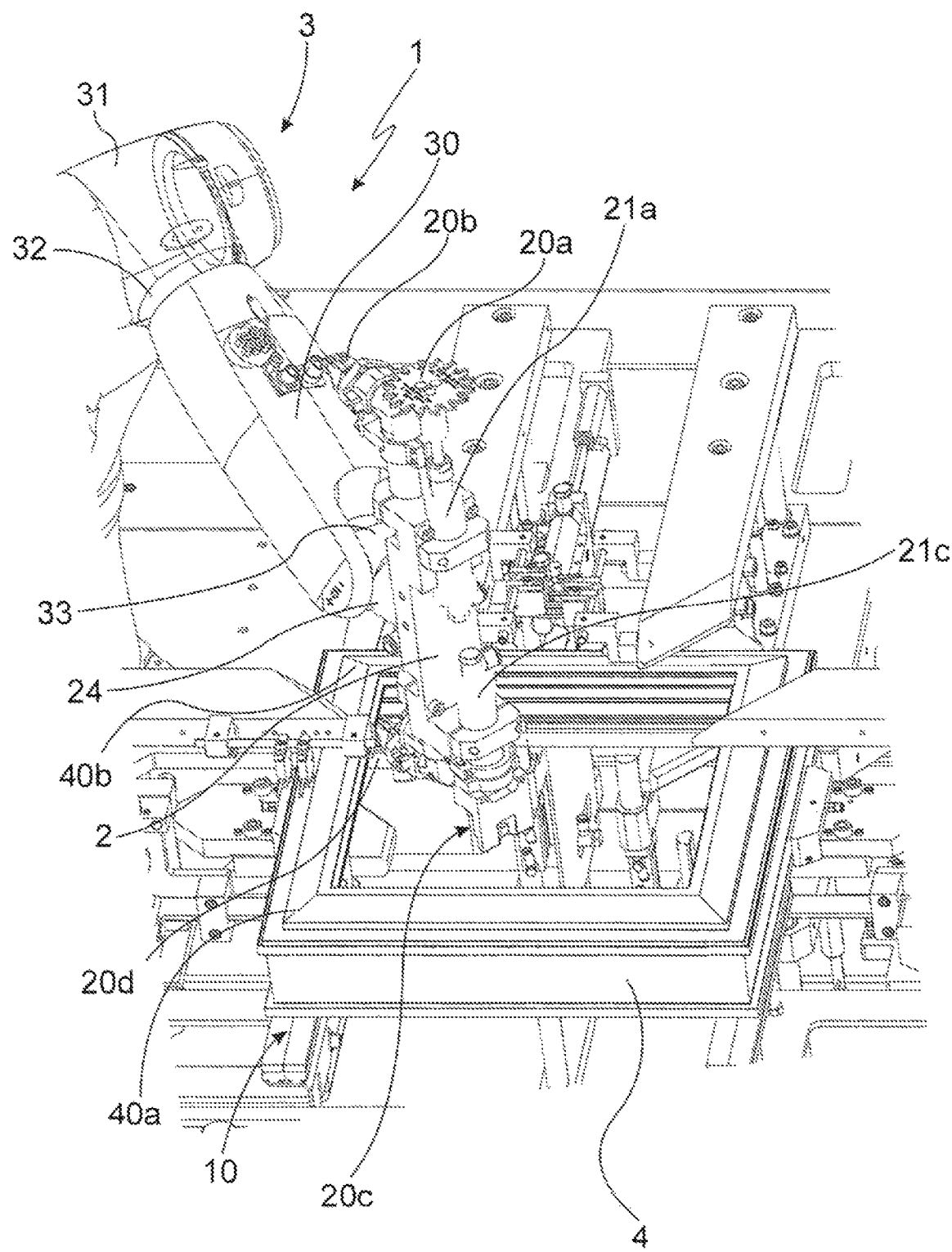
FIG. 1 in a three-dimensional view, the finishing device according to the invention being used as intended FIG. 2 the support arm of the finishing device according to the invention in a three-dimensional view

In FIG. 1, the finishing device 1 according to the invention is shown schematically. The frame to be machined 4, which is a window frame here, lies on a support surface 10 of the finishing device 1. Corresponding clamping devices are provided on the support surface 10 in order to hold frame 4 in position for the finishing work to be done.

40a and 40b are identified in the corners of frame 4. The weld bead is located in these mitered areas 40a and 40b, and this bead is to be removed using the finishing device 1 according to the invention. It is clear that this mitered area produces at all welded corners of the window frame 4.

A tool holder 2 is provided which supports a plurality of tools 20a to 20d. The tool holder 2 is held and moved by a machining arm 3. This machining arm 3 is an arm of an industrial robot, for example, which consists of a plurality of arm elements 30, 31 which are each connected together in hinged fashion through joints 32. In the process, the joints 32 are disposed at the respective arm elements 30, 31 such that the angular positions thereof can be adjusted relative to one another, corresponding drives (not shown) being provided to do so. It is clear that the respective angular position of the arm elements 30, 31 can also be fixed at the joints 32 as necessary. The tool holder 2 is held by the last arm element 30, and an interface 24 is provided at the tool holder 2 for connecting between this last arm element 30 to the tool holder 2.

The arm element 30 has a corresponding receptacle 33, which cooperates with the interface 24. Basically, the connection between the interface 24 and the receptacle 33 can be disconnected automatically, for example, in order to quickly and easily change from a first set of tools 20 that are located on a first tool holder 2 to a second tool set that is placed on a second tool holder, for example. Thus, for example, the tooling time involved in a dimensional change of the frame 4 to be finished can be considerably reduced, resulting in a high efficiency. In the process, the machining arm 3, which is designed as an industrial robot, is tilted to a changing position or changing station, for example, which is where the changing of the tool holder 2 takes place.

It is also an alternative that a joint is provided in the interface 24, in the receptacle 33 or between the arm element 30 and the tool holder 2, in order to achieve a hinged joint arrangement here as well, i.e. another degree of freedom.

Figure 2:
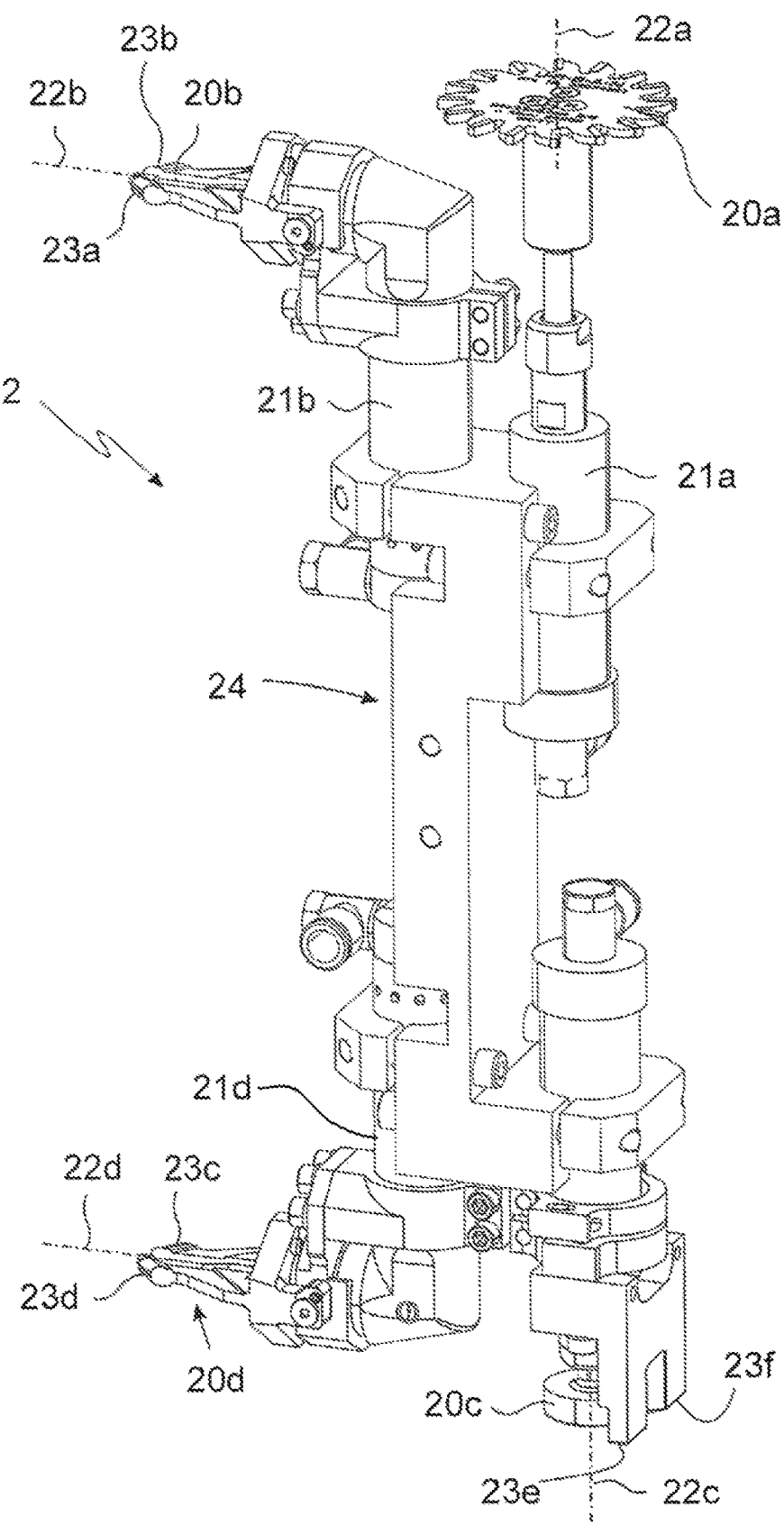

In FIG. 2, the tool holder 2 is show in a detailed view. The tool holder 2 is described as an elongated parallelepiped or bone-like member (expansion on the ends are connected by a narrower middle area). The interface 24 is located in the middle area, strictly speaking even in the area of the center axis of the tool holder 2. In the selected view, there are two tools 20 each located on top and bottom. In the top area is a first tool 20a, in this case a saw blade and a second tool 20b, here an end mill. In the bottom area of the tool holder 2, there are likewise two tools, namely a face or peripheral mill 20c and a wider tool 20d, an end mill. In FIG. 2, it is easily seen that the tools 20a to 20d are located at the respective ends of the tool holder 2 and in this way have as wide a separation from one another as possible in order to not mutually interfere with one another during use.

Each of the tools 20a to 20d shown here has a dedicated rotating drive 21a to 21d. These drives are cleverly designed as pneumatic motors that operate on compressed air and can be easily guided through the receptacle 33 and the interface 24. It is advantageous that the rotating drives 21a to 21d are designed as direct drives, in other words there are no transmissions located between the rotating drives 21a to 21d and the tools to be driven 20a to 20d, but the invention does not explicitly exclude such transmissions. Translational and/or angular transmissions can also be provided here.

The tool holder 2 shown here holds rotationally-driven tools 20a to 20d without exception. In other words, all tools used 20a to 20d are rotationally driven by rotational drives 21a to 21d, respectively, about the respective axes of rotation 22a to 22d.

The invention is characterized in particular in that the respective axes of rotation 22a to 22d can be oriented in a variety of ways in space. For example, the axis of rotation 22a of the first tool 20a designed as a saw blade is parallel to the longitudinal extension of the tool holder 2. Here, the first tool 20a is located on the back side opposite the interface 24 at the upper end of the tool holder 2.

Likewise, on the back side opposite the interface 24 there is also a rotationally-driven tool 20c at the lower end of the tool holder 2, the axis of rotation, i.e. tool axis 22c, thereof being at least parallel to tool axis 22a if not even in alignment therewith.

The tool holder 2 furthermore holds a further two tools 20b and 20d at the respective longitudinal ends of the holder, said tools facing the interface 24 and in particular being oriented in the direction of the machining arm 3. In the exemplary embodiment shown here of the tool holder 2, the respective tool axes 22b and 22d are oriented parallel relative to one another and are at right angles to tool axes 22a and 22c if not skew relative thereto.

A corresponding model for describing the respective angular position of the tool axes relative to another was already described above, the respective reference surfaces to which the respective tool axis represents a surface normal having been indicated there. These reference surfaces intersect at an angle, in the exemplary embodiment shown here 90°. It is clear that this angle can be arbitrary (for example acute), in order to execute special corner work, for example.

In this regard it should also be mentioned that the finishing device described here not only performs the finishing work in the classical manner, i.e. by removing a weld bead at the mitered surface in the corner area of a window made of plastic profiles, but this finishing device can also execute other functions. For example, the device is designed to produce openings for fastening hardware or the like. By using the much more mobile machining arm, it is possible to also execute corresponding, preferably cutting, operations at other points of the frame 4 held in the support surface 10.

Another advantage of the proposal according to the invention is that in addition to the blade 20*a* of a rotationally-driven tool 20, contact side members 23*a, b* are provided which permit the tool 20 to precisely remove the weld bead in the corner area of the frame 4. The advantage is that the contact side members 23*a, b* automatically detect the corner area (the assumption being that the tool holder 2 or the machining arm 3 that holds the tool holder 2 has the required mobility to allow detection independent of the actual motion or positional control system), and that exact positioning of the miter area in the clamping device of the support surface 10 is not absolutely necessary.

Corresponding contact side members 23*a* to 23*f* are provided at each of the tools 20*b, c*, and *d* up to the first tool 20*a* designed as a circular saw blade. The contact side members 23*a* to 23*f* basically prevent too deep of penetration of the tool into the profile and serve in particular to correctly position the tool in the respective corner.

The contact side members 23*e*, 23*f* of tool 20*c* are disposed on the bottom and primarily prevent too deep of a penetration of the mill into the profile. The primary task of the contact side members indicated here is not to position the tool in an internal corner.

Although the invention has been described in terms of specific embodiments which are set forth in considerable detail, it should be understood that this is by way of illustration only and that the invention is not necessarily limited thereto, since alternative embodiments and operating techniques will become apparent to those skilled in that art in view of the disclosure. Accordingly, modifications are contemplated which can be made without departing from the spirit of the described invention.

What is claimed is:

1. A finishing device for removing the weld bead generated during welding at mitered surfaces of a window frame, a door frame, or a section of a frame, the finishing device comprising:
   a support surface for the window frame, the door frame, or the frame section, and
   a processing arm for supporting a tool holder, wherein the processing arm comprises a plurality of arm elements configured to move in a hinged fashion relative to one another but can also be fixed in place, and wherein the tool holder comprises at least two cutting tools, wherein each of the at least two cutting tools is driven by a respective dedicated rotational drive, each of said at least two cutting tools rotating about a respective tool axis, and wherein contact side members are provided to the tool holder so as to be adjacent to at least one of the at least two cutting tools, wherein each of the contact side members has a respective front edge that sits against a profile surface of the window frame, the door frame, or the section of a frame when the respective cutting tool is used to remove the weld bead.

2. The finishing device according to claim 1, wherein the respective tool axes of the at least two cutting tools are not oriented parallel relative to one another.

3. The finishing device according to claim 1, wherein the tool axes of the at least two cutting tools are oriented relative to one another at right angles.

4. The finishing device according to claim 1, wherein each of the rotational drives comprises a respective pneumatic motor.

5. The finishing device according to claim 1, further comprising an interface provided in the center of the tool holder, wherein the tool holder can be connected to the arm elements of the processing arm at the interface.

6. The finishing device according to claim 5, wherein the at least two cutting tools on the tool holder are disposed with respect to each other on two differing sides of the interface.

7. The finishing device according to claim 5, wherein the at least two cutting tools on the tool holder are disposed at ends of the tool holder away from the interface.

8. The finishing device according to claim 1, wherein each of the at least two cutting tools is selected from a group consisting of a saw blade, an end mill, and a face mill.

9. The finishing device of claim 1, wherein an extension of the respective front edges of the contact side members include an angle that corresponds to an internal angle of the window frame, the door frame, or the section of a frame.

10. The finishing device of claim 1, wherein the contact side members prevent the respective cutting tool from plunging too deeply into the profile surface.

\* \* \* \* \*